(12) United States Patent
Taylor

(10) Patent No.: US 6,700,879 B1
(45) Date of Patent: Mar. 2, 2004

(54) MODEM LOOP RATE ADAPTATION

(75) Inventor: Thomas P. Taylor, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/049,928

(22) Filed: Mar. 30, 1998

(51) Int. Cl.[7] .................................................. H04Q 7/00
(52) U.S. Cl. ........................ 370/332; 455/69; 455/522
(58) Field of Search ................................ 370/468, 437, 370/431, 480, 482, 493, 494, 465; 375/222; 455/524, 69

(56) References Cited

U.S. PATENT DOCUMENTS

| | | | | |
|---|---|---|---|---|
| 4,000,371 A | | 12/1976 | Ogawa .................... 179/2 DP |
| 4,580,262 A | * | 4/1986 | Naylor et al. ................. 455/69 |
| 4,680,781 A | | 7/1987 | Amundson et al. ............. 375/8 |
| 4,691,342 A | | 9/1987 | Waldron et al. .............. 379/98 |
| 4,756,007 A | | 7/1988 | Qureshi et al. ................ 375/37 |
| 5,023,869 A | | 6/1991 | Grover et al. ................. 370/84 |
| 5,216,692 A | * | 6/1993 | Ling .......................... 370/342 |
| 5,245,629 A | * | 9/1993 | Hall ........................... 455/522 |
| 5,353,280 A | | 10/1994 | Ungerböck ................. 370/32.1 |
| 5,461,639 A | * | 10/1995 | Wheatley et al. ........... 370/342 |
| 5,603,096 A | * | 2/1997 | Gilhousen et al. ............ 455/69 |
| 5,812,938 A | * | 9/1998 | Gilhousen et al. ............ 455/69 |
| 6,073,025 A | * | 6/2000 | Chheda et al. .............. 455/522 |
| 6,085,106 A | * | 7/2000 | Sendonaris et al. ......... 455/522 |
| 6,085,108 A | * | 7/2000 | Knutsson et al. ........... 455/522 |
| 6,104,933 A | * | 8/2000 | Frodigh et al. ............. 455/522 |
| 6,144,695 A | * | 11/2000 | Helmds et al. .............. 370/503 |
| 6,167,095 A | * | 12/2000 | Furukawa et al. .......... 370/468 |
| 6,259,927 B1 | * | 7/2001 | Butovitsch et al. ......... 455/522 |

* cited by examiner

Primary Examiner—Steven H D Nguyen
Assistant Examiner—Phuongchau Ba Nguyen

(57) ABSTRACT

The data communications rates on a communication line between a central office (CO) and a customer premises equipment (CPE) modem are set by initially attempting to synchronize at a base upstream and downstream rate. The CO then requests that the CPE modem send upstream a signal to noise ratio (SNR) indication and, based on this, predicts the maximum attainable downstream rate. An attempt is then made to synchronize on this new rate. If successful, then, the CO reads the upstream SNR and based on this attempts to maximize the upstream rate. Line quality is then monitored and adjusted as necessary.

10 Claims, 15 Drawing Sheets

MODEM LOOP RATE ADAPTATION

BACKGROUND OF THE INVENTION

This invention relates to a method and system for setting a communication rate on a communications line.

When one modem wishes to communicate with another modem, a compatible communications rate must be found for both directions of communication. One technique used in determining a compatible communication rate is for a transmitting modem to send tones unique to transmitted data rates. Another technique is for a transmitting modem to send a pre-determined character which is determined prior to use of the system (e.g., the letter "a"). The receiving modem oversamples the received waveform and, knowing that it represents the agreed character, can determine the transmission rate. It is also known for a receiving modem to send error detection information back to a transmitting modem. In such case, if an error rate is too high, the communications rate is reduced.

This invention seeks to provide an efficient approach to communications rate setting.

SUMMARY OF INVENTION

According to the present invention, there is provided a method of setting a downstream communications rate on a communications line, comprising the steps of: where no downstream communications rate is established on said communications line, establishing a base downstream communications rate on said communications line; determining a downstream signal to noise ratio (SNR) on said communications line; based on said downstream SNR, predicting an acceptable downstream communications rate; if said predicted acceptable downstream communications rate is greater than said established downstream communications rate, sending an indication of a new downstream communications rate on said line based on said predicted downstream communications rate and thereafter attempting to establish said new downstream communications rate on said line.

According to another aspect of the present invention, there is provided a method of setting an upstream communications rate on a communications line, comprising the steps of: where said communications line is silent in a downstream direction, sending energy pulses upstream and monitoring for transmissions downstream at a predetermined downstream base communications rate; on detecting downstream transmissions at said pre-determined downstream base communications rate, synchronising to said downstream transmissions; processing each downstream transmission for a message comprising an upstream communication rate and, thereafter, transmitting upstream at said upstream communications rate.

In accordance with yet another aspect of the present invention, there is provided a system for setting a communications rate on a communications line, comprising, at an upstream end of said communications line: means, where no downstream communications rate is established on said communications line, for establishing a base downstream communications rate on said communications line; upstream means for determining a downstream signal to noise ratio (SNR) on said communications line; upstream means, based on said downstream SNR, for predicting an acceptable downstream communications rate; upstream means, if said predicted acceptable downstream communications rate is greater than said established downstream communications rate, for sending a message downstream indicating a new downstream communications rate on said line based on said predicted downstream communications rate and thereafter attempting to establish said new downstream communications rate on said line.

BRIEF DESCRIPTION OF THE DRAWINGS

In the figures which illustrate preferred embodiments of the invention.

DETAILED DESCRIPTION OF THE PREFERRED EMBODIMENTS

Figure 1:
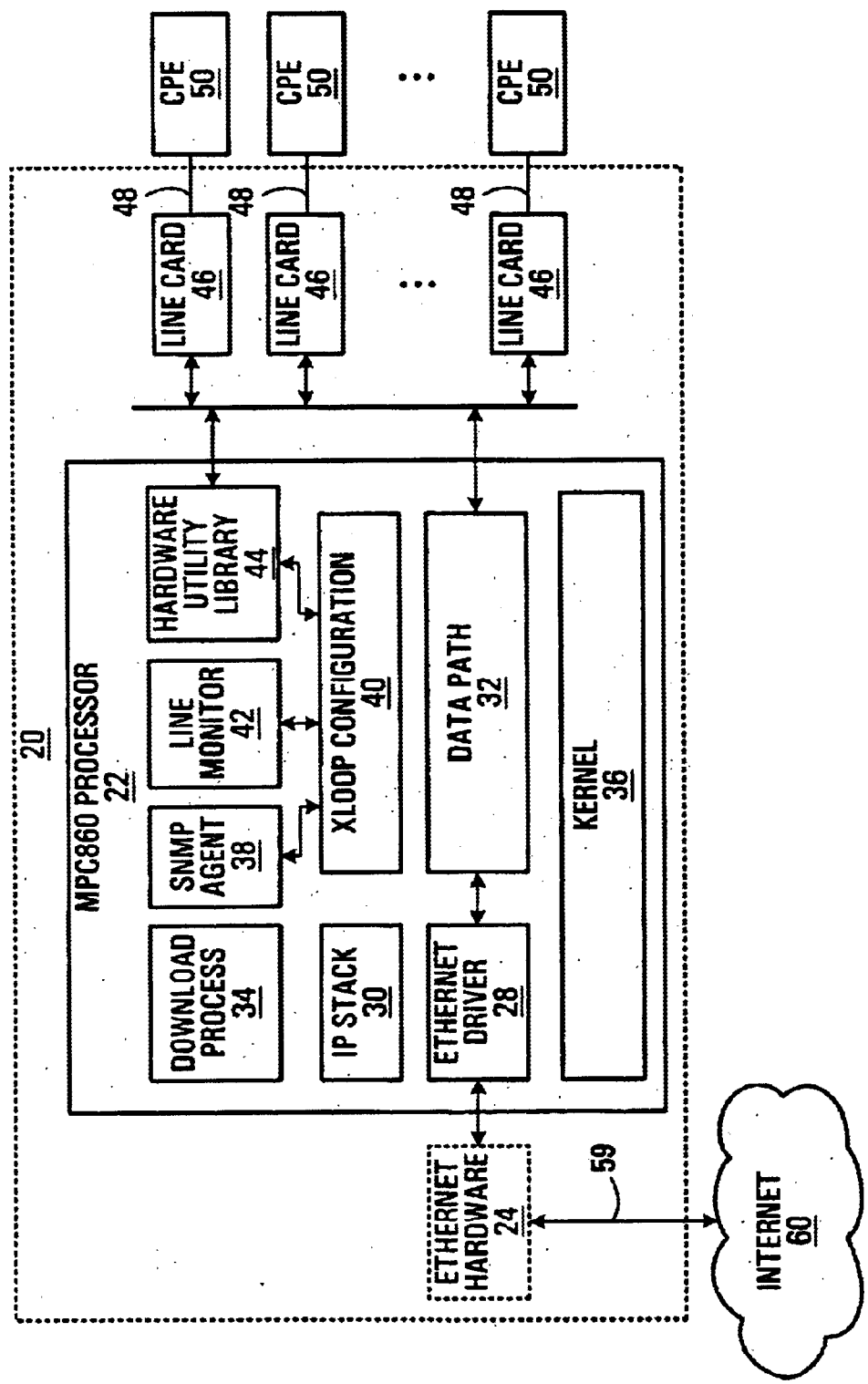
FIG. 1 is a block diagram of a system made in accordance with this invention.

Turning to FIG. 1, a communications system 10 comprises a central office (CO) telephone switch, or head end, 20 connected to customer premises equipment (CPEs) 50 by way of subscriber lines (or loops) 48 and an internet 60 by way of data path 59. The CPEs include modems which transmit and receive data and which pass voice unaltered. To enhance utility of the line, preferably data is transmitted over voice. To this end, voice may occupy the frequency band from 0 to 4 kHz and data the frequency band from 70 to 320 kHz. Many subscriber lines comprise a twisted copper pair. With copper wire, such factors as the length of the subscriber loop, the gauge of the wire and the frequency of a signal affect attenuation and distortion on the loop. This suggests a need to be able to choose between a number of different communication rates for a communications path quite apart from the data rate capabilities of the CPE modems. Further, with an internet connection, most data moves in a downstream (DS) direction from the CO to the CPE modem and little moves in the upstream (US) direction from the CPE modem to the CO. Given these criteria, the possible downstream communication rates are preferably: 80 kb/s, 160 kb/s, 240 kb/s, 320 kb/s, 640 kb/s, and 960 kb/s and the possible upstream communication rates are 40 kb/s, 80 kb/s, and 120 kb/s. Preferably the modulation scheme used by the CO modems and the CPE modems is quadrature amplitude modulation (QAM). Given that 4 QAM has 2 b/symbol, 16

QAM has 4 b/symbol and 64 QAM has 6 b/symbol, the DS and US rates translate to the following:

Downstream 80 kb/s is 4 QAM narrow band (NB) given 40 ksymbols/s 160 kb/s is 16 QAM NB given 40 ksymbols/s 240 kb/s is 64 QAM NB given 40 ksymbols/s 320 kb/s is 4 QAM wide band (WB) given 160 ksymbols/s 640 kb/s is 16 QAM WB given 160 ksymbols/s 960 kb/s is 64 QAM WB given 160 ksymbols/s Upstream 40 kb/s is 4 QAM NB given 20 ksymbols/s 80 kb/s is 16 QAM NB given 20 ksymbols/s 80 kb/s is 64 QAM NB given 20 ksymbols/s The head end comprises a processor 22 connected between ethernet hardware 24 and line cards 46. The ethernet hardware connects to the internet (or other local area network—LAN—or wide area network—WAN) 60; the line cards function as modems with each line card connected to a CPE 50 over a subscriber line 48. The processor has an ethernet driver 28 connected to the ethernet hardware, an internet protocol (IP) stack 30, and a datapath 32. The datapath connects to the line cards. The IP stack is connected to a download process 34. The processor also has a kernel 36. A loop configuration controller 40 is connected to a simple network management protocol (SNMP) agent 38, a line monitor 42, and a hardware utility library 44. The hardware utility library is also connected to the line cards.

The processor 22 may communicate with the internet 60 utilizing the IP stack and download process in a manner understood by those skilled in the art. A CPE modem, when powered, is connected to the internet 60 through the CO 20 on a communication path. This invention concerns the setting of communications rates on a subscriber line which is part of such a communication path as part of the set up of a communication link over the communication path. When a communication link is operational over the communication path, ethernet data may flow from the internet 60 to the CO and be transferred through the processor 22 in any suitable manner to the line card 46 in the communication path. As will be described hereinafter, the data may then be encapsulated in frames, modulated, and sent downstream over the subscriber line. At the CPE, demodulation allows recovery of the frames and data may then be extracted from the frames. The process works in reverse for data sent upstream from the CPE.

Figure 2:
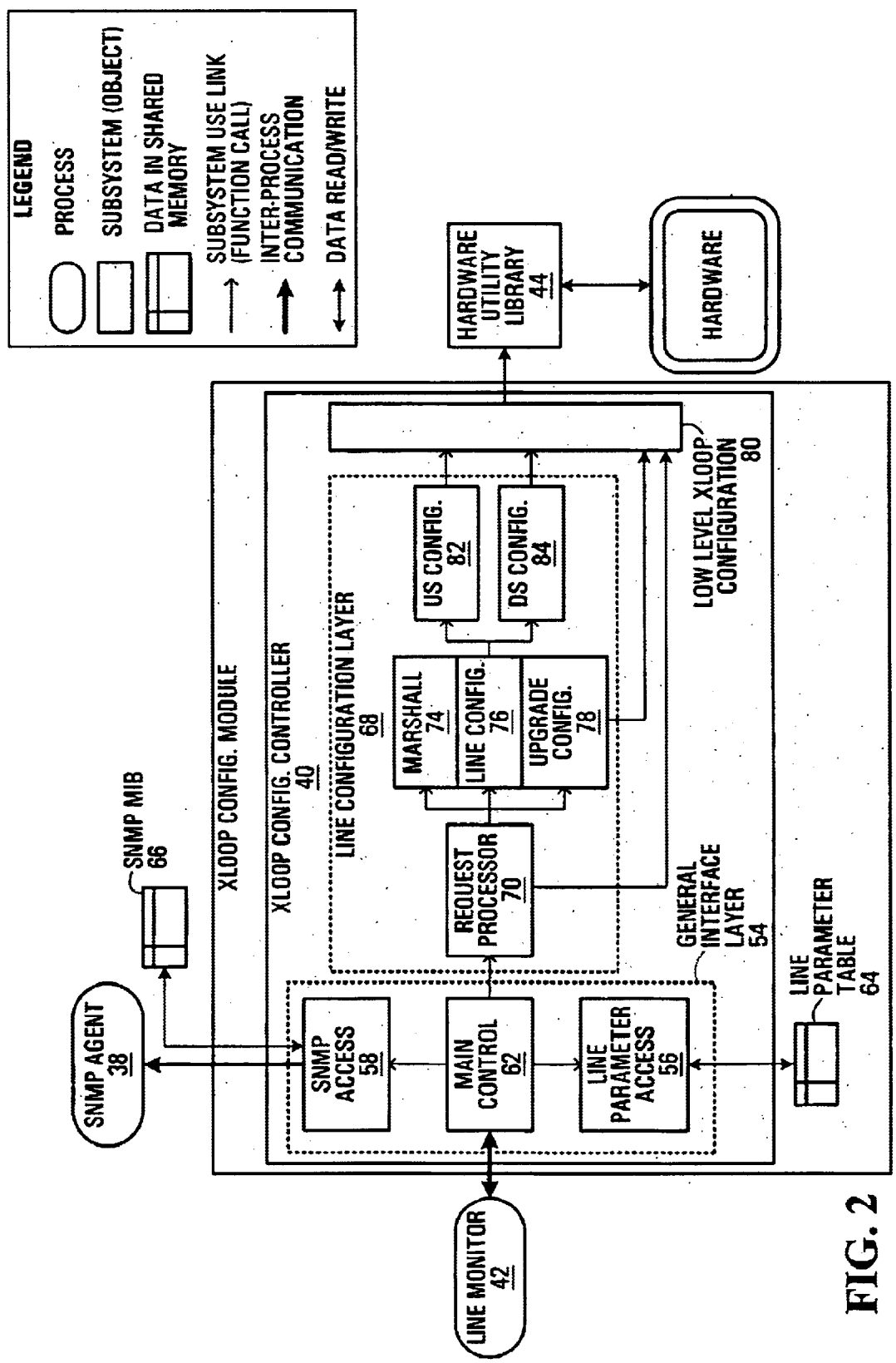
FIG. 2 is a block diagram detail of a portion of the head end of FIG. 1.

Turning to FIG. 2 which details the processes of the line configuration controller 40, controller 40 comprises a general interface layer 54 having a line parameter access block 56 and an SNMP access block 58 communicating with a main control block 62. The line parameter access block also communicates with a line parameter table memory 64 and the SNMP access block also communicates with the SNMP agent 38 and an SNMP management information (data) base (MIB) 66. The main control also communicates with the line monitor 42 and a request processor 70 of a line configuration layer 68. The request processor communicates with a marshaller 74, a line configurator 76, an upgrade configurator 78, and a resynchronisation and change configurator 80. The line configurator communicates with an upstream (US) configurator 82 and a downstream (DS) configurator 84. The resynchronisation and change configurator 80 communicates with the hardware utility library 44.

Figure 3:
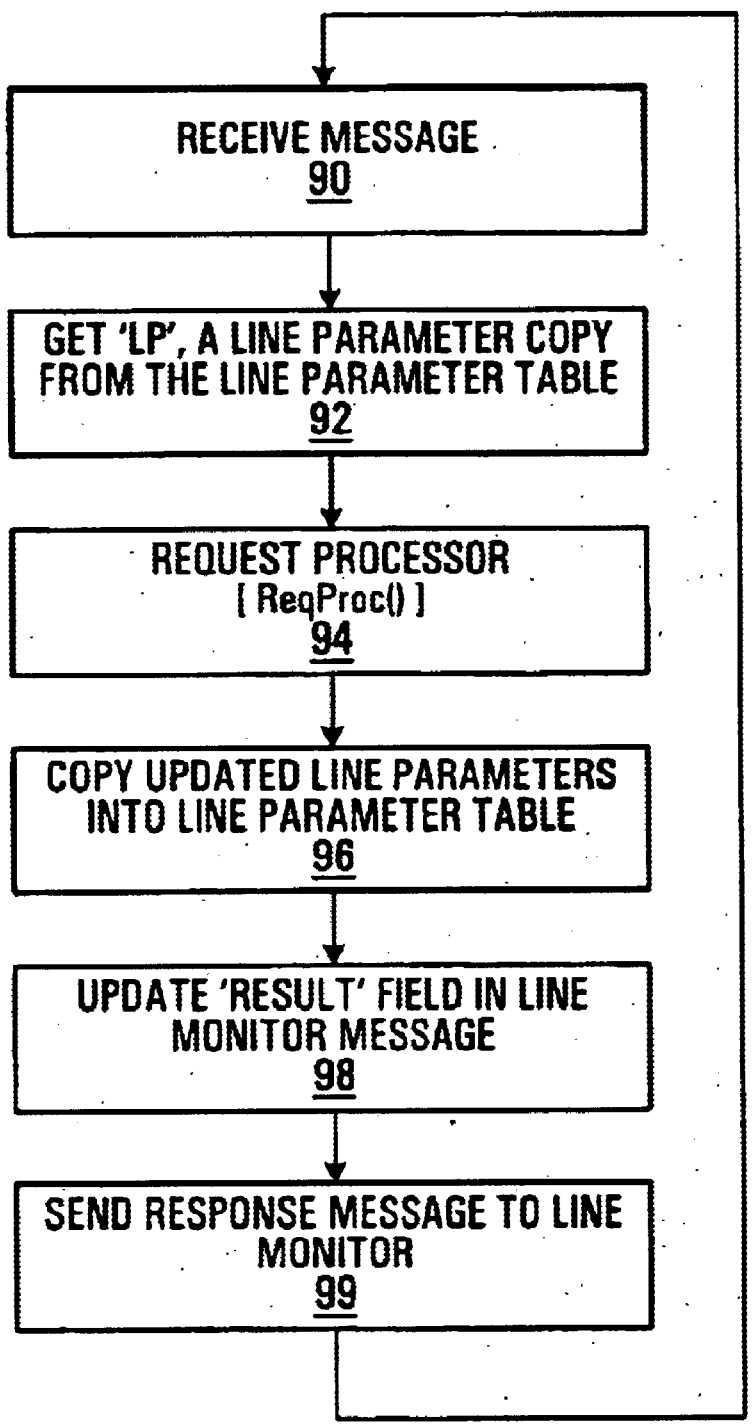
FIG. 3 is a flow diagram for the control of the main control of FIG. 2.

Whenever a CPE modem 50 (FIG. 1) of a subscriber line 48 (FIG. 1) is powered (and the CO is active), the CO establishes a communications path between the CPE modem and the internet 60 through the line card 46 (FIG. 1) associated with the subscriber line. Upon the communications path being established, an identification of the CPE subscriber line is sent to the line monitor 42. The line monitor responds by sending a message identifying the subscriber line to a message queue associated with the main block 62 of the general interface layer 54. Where a communication path which includes a subscriber line has been previously established, the line monitor 42 will periodically send a message to the main control block identifying the subscriber line (for the purpose of maintaining line quality, or re-establishing a failed link, as will become apparent hereinafter). Further, the line monitor will send a message if the SNMP for a line which is part of a communications path changes. The operation of the main control block is described in conjunction with FIG. 3. In state 90, the main control block 62 reads a message (if any) from its line monitor message queue. It then queries the line parameter access block 58 with the subscriber line identified in the message in order to have this block 58 return a copy of any line parameter table for the line from the line parameter table memory 64 (state 92). If the line is newly connected to the internet, this table will be blank. If the line is currently configured, this table will indicate the US and DS communication rates and the US power level. The main control block also queries the SNMP agent to have this agent return the maximum permissible downstream data communication rate for the subscriber line from the SNMP MIB. By way of explanation, the charge to a subscriber for internet access may be dependent upon the downstream communications rate that the subscriber wishes to have for an internet connection. If so, a subscriber may choose a lower cost, lower rate connection which establishes a maximum permissible downstream rate for that subscriber line.

The main control block 62 next passes any line parameters and the maximum downstream communications rate to the request processor 70 (state 94). As will be described hereinafter, the request processor returns updated line information to the main control block. The main control block passes updated line parameters to the line parameter access block 56 so that block 56 updates the line parameter table in line parameter table memory 64 with the updated line parameters (state 96). The main control block then composes a message to the line monitor 42 (state 98) which indicates the state of the subscriber line, namely, that the line is active (okay), attempts at configuration have failed, or that the line card has been put in power save mode. This message is then sent to the line monitor (state 99) and program control for the main control block then passes back to state 90 where the block checks for another line monitor message.

Figure 4:
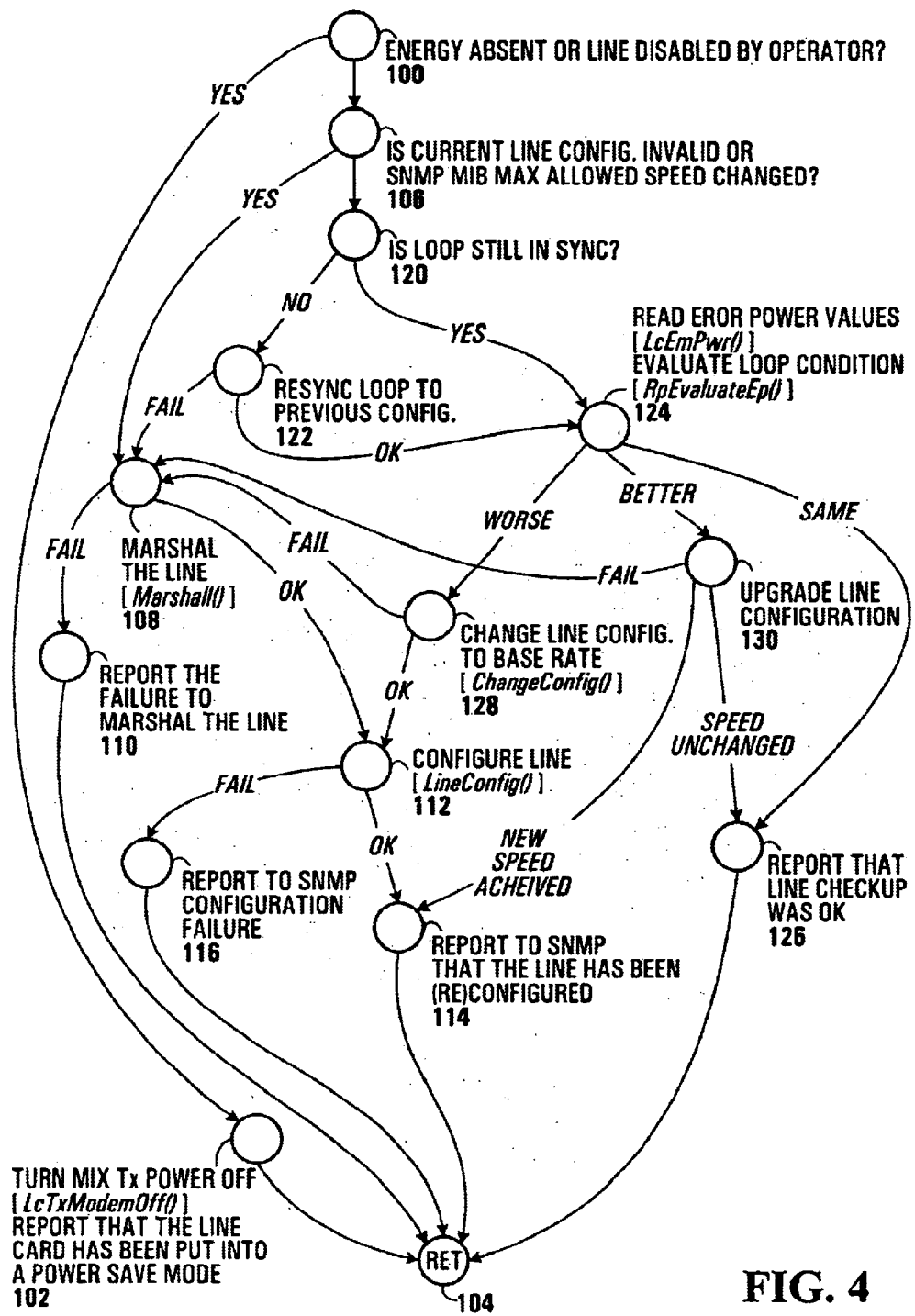
FIG. 4 is a flow diagram for the control of the request processor of FIG. 2.

The operation of the request processor 70 is described in conjunction with FIG. 4. On receiving a message from the main control block, the request processor tests for US energy on the subscriber line specified in the message. The request processor also checks whether the line has been disabled at the CO—a "line disabled" indication is provided by the SNMP agent, preferably by setting the maximum line rate to zero (state 100). If energy is absent or the line is disabled, the request processor disables the transmitter of the line card 46 (FIG. 1) terminating the specified subscriber line and turns the power off for the line card associated with that line card. The request processor then reports these actions to the main control block (state 102) and returns control to the main control block (state 104). If US energy is present on the line and the line is not disabled, then the request processor looks at the line parameter table and maximum permissible downstream data communication rate. Where the line parameter table is blank because the communications path is newly established (or if it is otherwise apparent from the line parameter table that the line configuration is invalid—i.e., there are error conditions indicated in the table) or if the maximum permissible rate has changed (state 106), then the request processor passes control to the marshaller to marshal the line (state 108).

Figure 5:
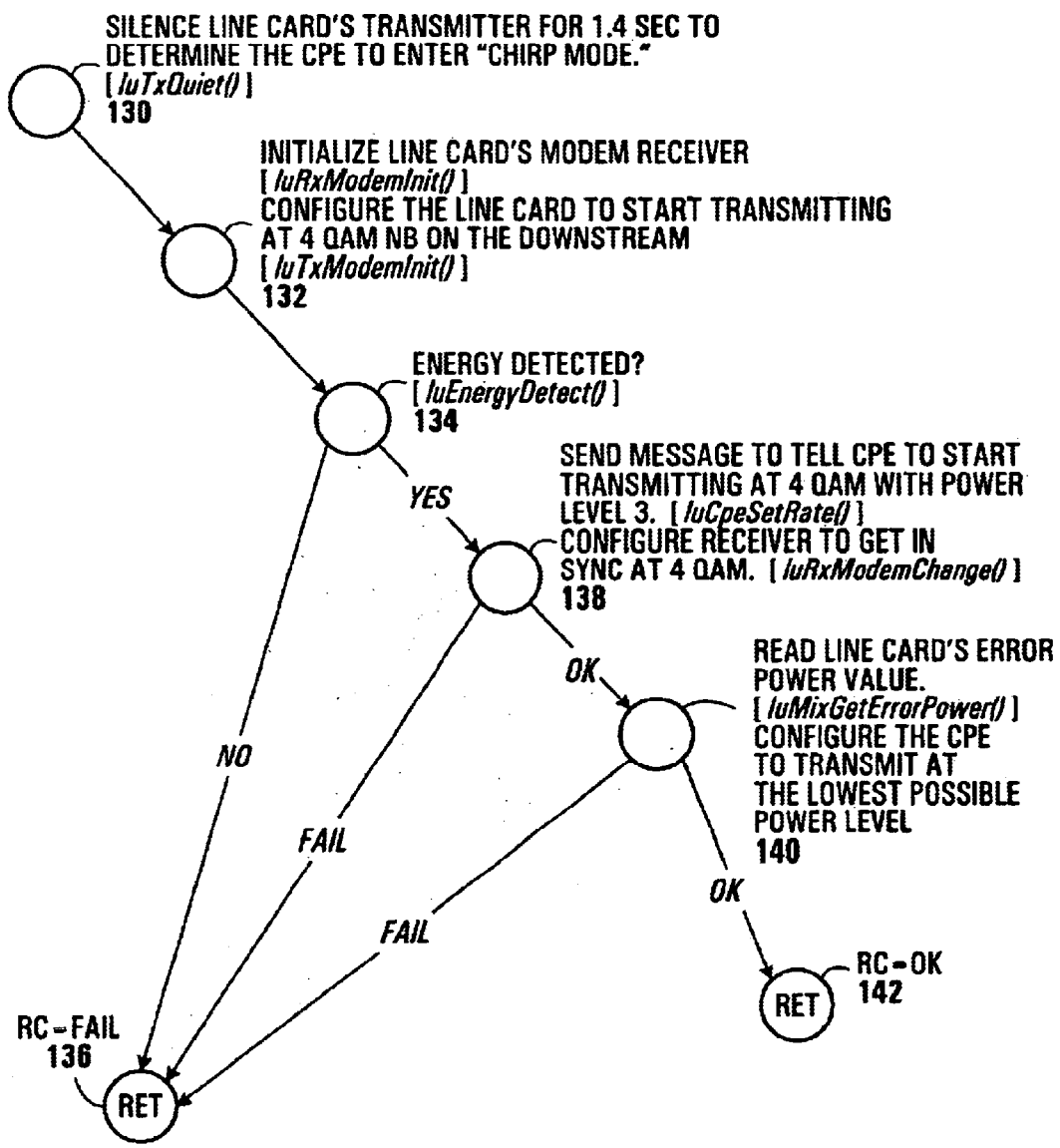
FIG. 5 is a flow diagram for the control of the marshaller of FIG. 2.

Referencing FIG. 5 along with FIG. 2, when the marshaller 74 is invoked, it silences the subscriber line in the downstream direction for a pre-determined time, preferably 1.4 seconds, by silencing the transmitter of the line card terminating the line (state 130). This causes the CPE modem terminating the line to "chirp", i.e., send energy pulses upstream (which is in the direction from the CPE to the CO). The marshaller then initializes the line card receiver and configures the line card to start transmitting downstream at a pre-determined downstream base communications rate (state 132). Normally this DS base rate is 4 QAM NB. The marshaller then monitors for upstream energy on the communications line—the chirping energy (state 134). If no energy is detected, the marshaller returns a failed condition to the request processor (state 136). If, as will normally be the case, upstream energy is detected, the marshaller 74 prompts the line card to send a message downstream asking the CPE to begin transmitting at a specified upstream communications rate—preferably a base rate of 4 QAM—and an upstream high power level (state 138) and to include a message stating the power level of transmission for these US transmissions. Simultaneously, the marshaller configures the receiver of the line card for synchronising to 4 QAM upstream transmissions. When the line card receiver detects upstream transmissions at 4 QAM, it synchronises to the upstream transmissions.

The modems of CPE 50 (FIG. 1) and the line cards have the capability of detecting the signal-to-noise ratio (SNR) on the subscriber line 48 (FIG. 1) in decibels. Circuitry for providing this capability is known to those skilled in the art and, therefore, not further described. The SNR, in decibels, is an error power reading. The CPE modems detect the error power of the DS transmissions and the line card modems detect the error power of the US transmissions.

The marshaller reads the US error power reading from the line card and the current power level which is returned by the CPE in its US transmissions. If the upstream error power level exceeds a threshold, the marshaller includes a message in downstream transmissions requesting that the CPE modem reduce the upstream power level and to report on the new power level in its US transmissions. This process is repeated if the US transmissions at the new power level (as ascertained by the current power level indicated by way of message in the US transmissions) continue to exceed the threshold. In this way, the CPE may be configured to transmit at the lowest possible power level (state 140). Once this is accomplished, the marshaller returns an ok condition to the request processor (state 142) and control passes back to the request processor. If for some reason the steps to be taken in either of states 138 or 140 fail, then the marshaller returns a failed condition to the request processor (state 136).

Returning to FIG. 4, where the marshaller returns a failed condition, the request processor reports the failure to the main control block (state 110) and returns control to the main control block (state 104). On the other hand, where the marshaller returns an indication that the subscriber line has been marshalled, the request processor 70 calls up the line configurator 76 (state 112).

Figure 6:
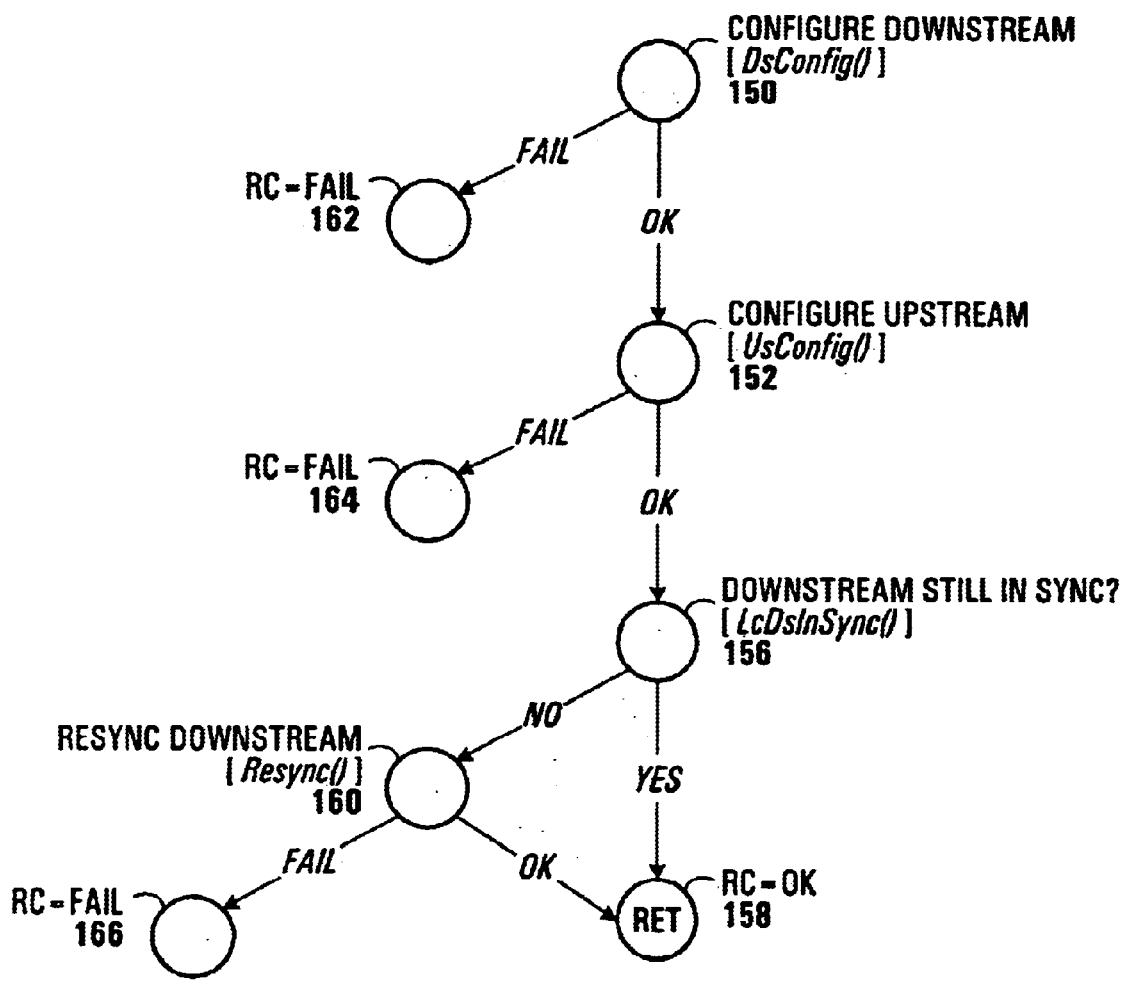
FIG. 6 is a flow diagram for the control of the line configurator of FIG. 2.

Control passes to the line configurator when a communication link is established and the US and DS communication rates are set at the base rates of 4 QAM NB DS and 4 QAM US (US is always NB), either through marshalling of the line or when the line has been returned to the base rate in state 114, as will be described more fully hereinafter. Turning to FIG. 6, the line configurator 76 initially calls the downstream configurator 84 to set a DS rate (state 150), then the upstream configurator 82 to set an UP rate (state 152) and then checks whether the downstream is still in synchronisation (state 156). If yes, the line configurator returns an ok code (state 158). If no, the line configurator calls the resynchronisation utility of resynchronisation and change configurator 80 (state 160) in an attempt to resynchronise the CPE modem on the DS rate chosen by the DS configurator. If configurator 80 successfully resynchronise the line, again an ok code is returned. If DS configuration, US configuration, or resynchronisation fails, a failed code is returned to the request processor (states 162, 164, 166).

Figure 7:
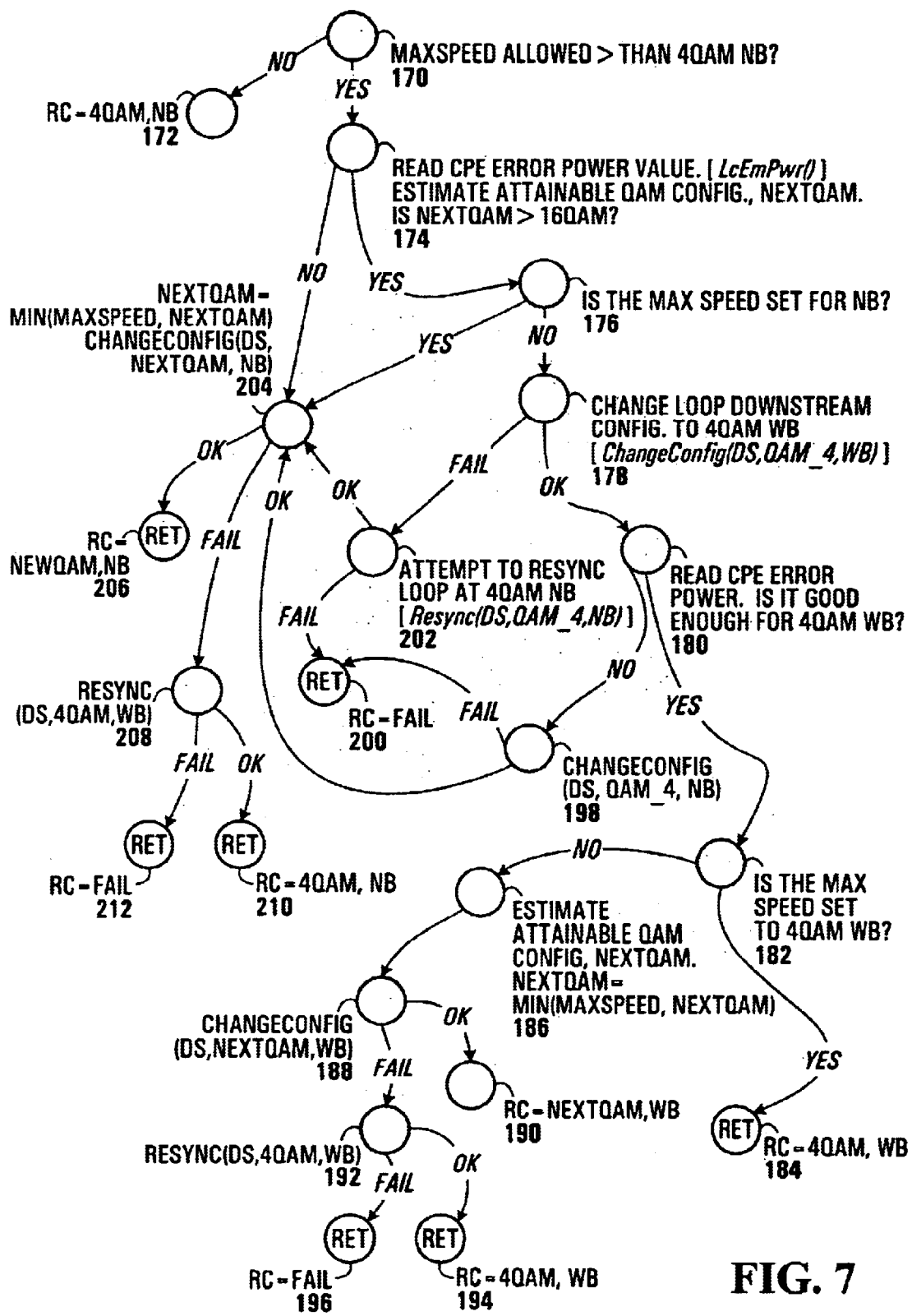
FIG. 7 is a flow diagram for the control of the downstream configurator of FIG. 2.

Referencing FIG. 7, when the DS configurator 84 is called it checks whether the maximum DS rate exceeds the base rate of 4 QAM (state 170). If not, control simply passes back to the line configurator (state 172). If yes, it reads the downstream SNR (error power value) from the CPE (as provided by the CPE in US transmissions). Based on the DS error power value it predicts an acceptable downstream communications rate and stores this in a variable "NextQAM" (state 174). Note that a rate prediction is always for the current band. In other words, if the band is NB, the prediction is a rate prediction for NB and if the band is WB, the rate prediction is a prediction for WB. It is considered that an error power value of 14.5 dB is required on a communication rate of 4 QAM (NB or WB), 21.5 dB is required for a rate of 16 QAM and 27.5 dB is required for a rate of 64 QAM. If NextQAM is greater than 16 QAM, and the maximum speed is not set for NB (state 176), then the desired DS rate is set to 4 QAM WB and a change configuration utility of resynchronisation and change configurator 80 is called and passed the parameters DS and 4 QAM WB (state 178).

Figure 9:
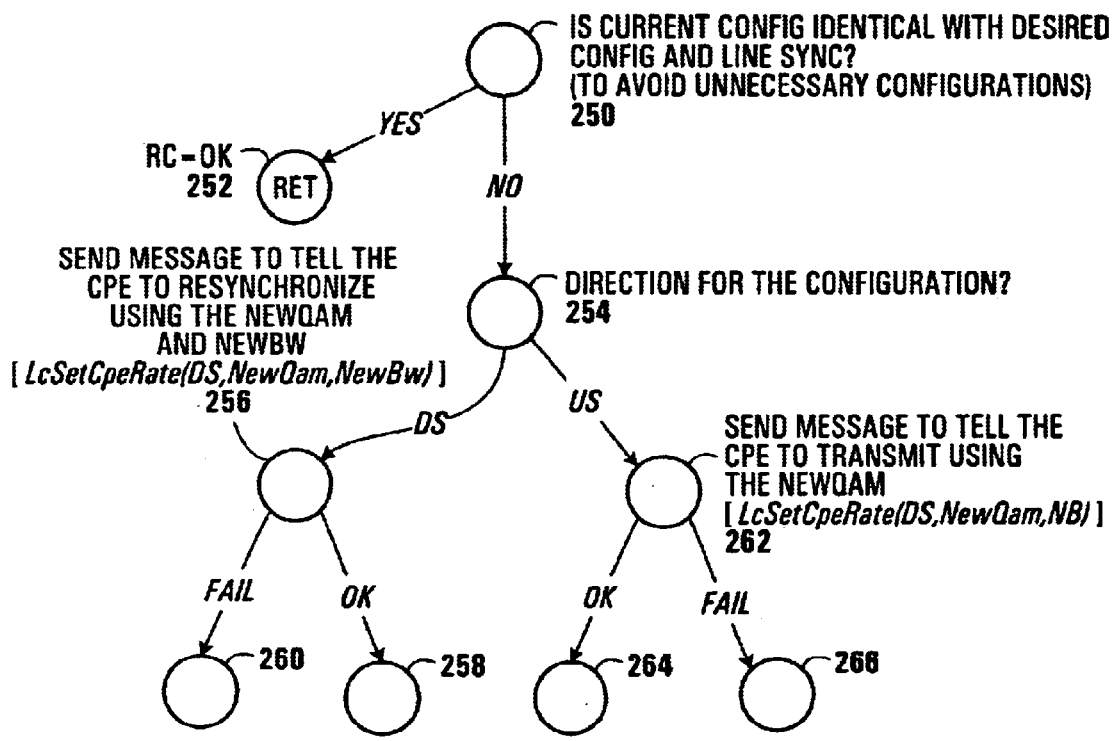

Turning to FIG. 9, the change configuration utility, if the rate parameter is the same as the current rate and the line is in synchronisation simply returns an ok indication (states 250, 252). Otherwise, where the direction parameter indicates DS (state 254), a message is sent in the DS transmissions to the CPE instructing it to resynchronise on the new rate (state 256). If the CPE returns an indication in the US transmissions that resynchronisation has occurred, the change configuration utility returns an ok indication; otherwise it returns a failed indication (states 258, 260).

If the change to 4 QAM WB was successful, the DS configurator reads the CPE error power value (state 180). If this is sufficient to support the new communication rate and the maximum rate is set to 4 QAM WB, then the DS configurator returns this value to the line configurator (states 182, 184). If the maximum rate is not limited to 4 QAM WB, then, based on the error power rate, the attainable rate is estimated and the lesser of this predicted acceptable rate and the maximum rate is passed as a parameter to the change configuration utility along with an indication the rate is to be WB and that it is the DS which is to be configured (states 186, 188). If the change configuration utility is successful at changing the rate, then this new rate is returned to the line configurator (state 190), otherwise the DS configurator calls the resynchronisation program of resynchronisation and change configurator 80 (state 192) in an attempt to re-establish the rate at 4 QAM WB. In doing so, the DS configurator passes the parameters DS and 4 QAM WB to the resynchronisation utility.

Figure 10:
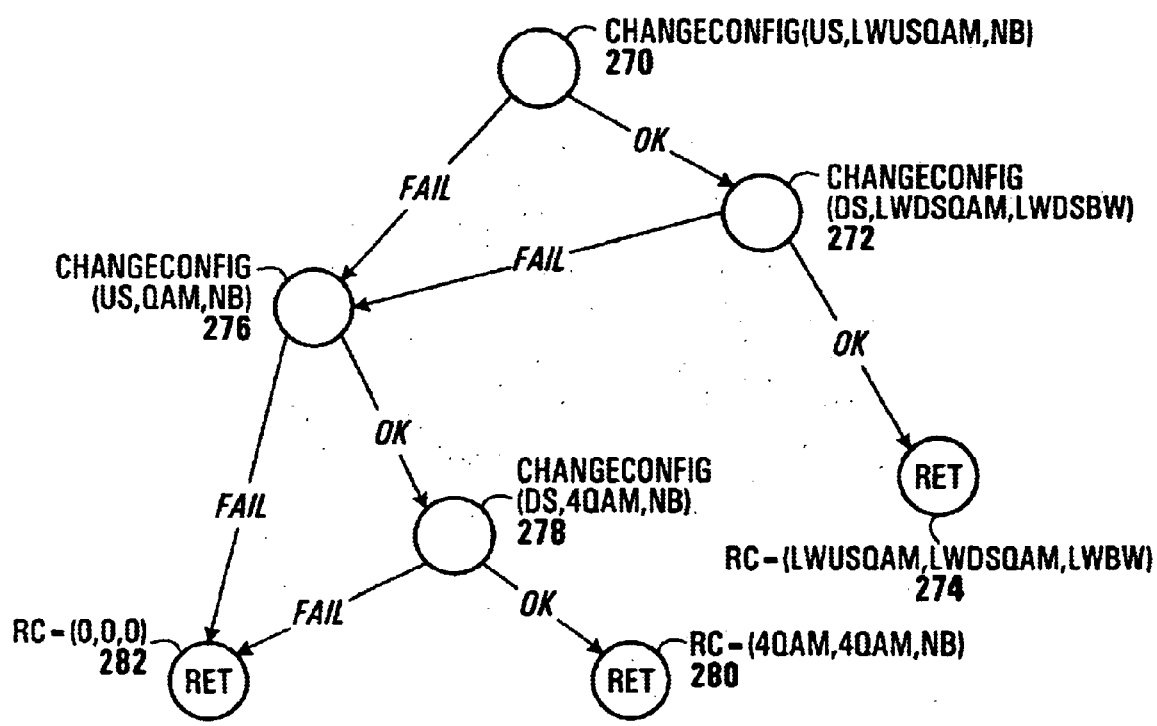

Turning to FIG. 10, the resynchronisation utility skips the state to resynchronise the US rate (state 270) and invokes the change configuration utility (state 272) to change the DS rate passing it an indication the DS is to be changed and the desired new rate. If the change configuration utility is successful then the resynchronisation utility so indicates to the DS configurator (state 274). If not, the change configuration utility is again invoked, this time with parameters to change the DS rate to the base rate of 4 QAM NB (states 276, 278). If this succeeds, the DS configurator is informed of the resynchronisation to the new rate (state 280); if it fails, the DS configurator is so advised (state 282).

Based on the return code from the resynchronisation utility, the DS configurator returns the rate 4 QAM WB or a failed indication to the line configurator (states 194, 196).

Returning to state 180, if the CPE error power value was insufficient to support 4 QAM WB, the DS configurator invokes the change configuration utility in an attempt to re-establish the rate at 4 QAM NB (state 198). If this fails, the DS configurator returns a failed indication to the line configurator (state 200). Similarly, returning to state 178, if when the change configuration utility was invoked it failed to configure the line to 4 QAM WB, the DS configurator attempts to resynchronise the DS rate to 4 QAM NB using the resynchronisation utility (state 202). If this fails, state 200 is again reached. If 4 QAM NB is re-established through either route, state 204 is reached. State 204 is also reached if, in state 176 the maximum speed is set for NB or in state 174 the estimated attainable rate is not greater than 16 QAM.

In state 204, the value for NextQAM is set at the lesser of its current value and the maximum permissible rate. Then the change configuration utility is invoked with and indication it is the DS rate which is to be changed and the parameters NextQAM along with an indication the bandwidth is NB. If this succeeds, the line configurator is informed accordingly (state 206). If it fails, an attempt is made to resynchronise to 4 QAM NB (state 208) and the line configurator is informed of the result (states 210, 212).

Figure 8:
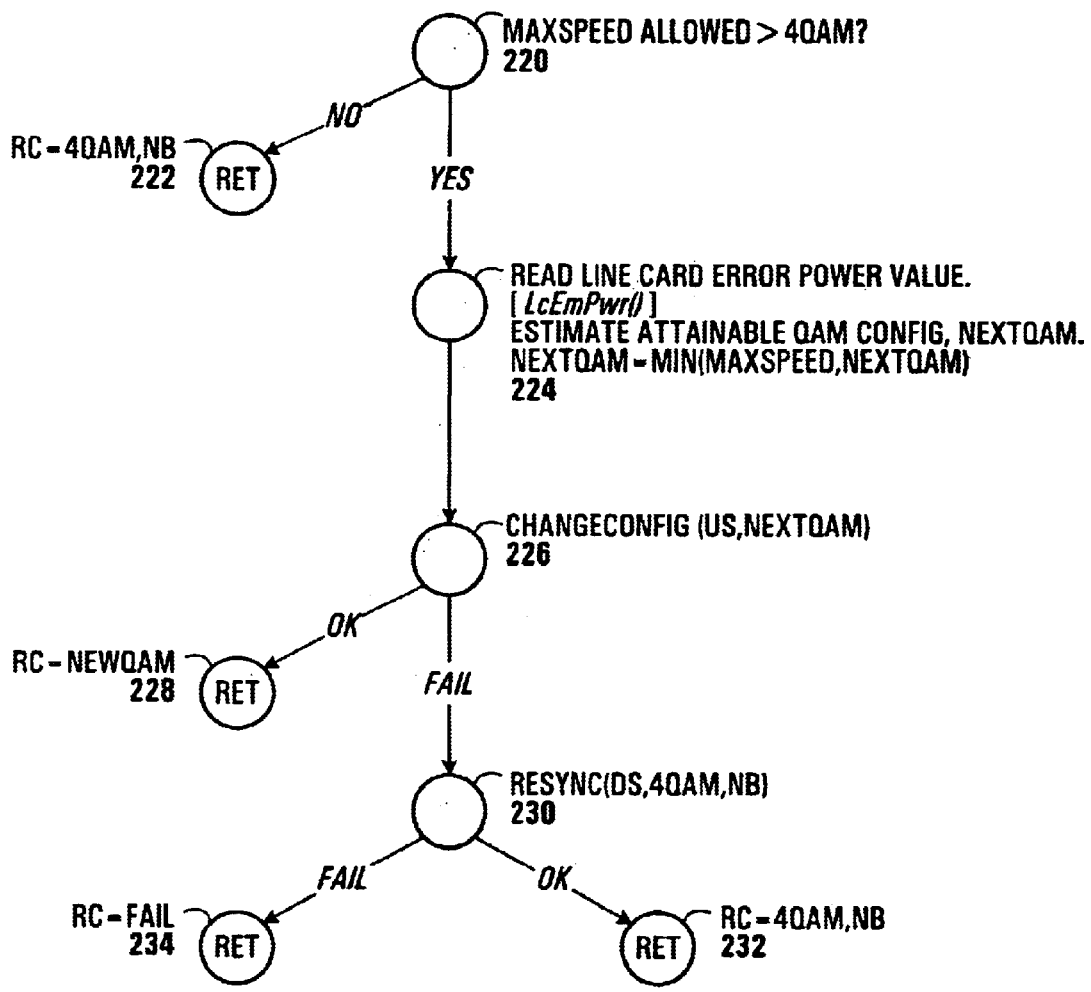
FIG. 8 is a flow diagram for the control of the upstream configurator of FIG. 2, FIGS. 9 and 10 are flow diagrams of the resynchronisation and change configurator of FIG. 2.

Turning to FIG. 8, when the upstream configurator is called by the line configurator, if the maximum permissible rate is the base rate of 4 QAM, the US configurator simply returns this rate (states 220, 222). If not, the error power value measured by the line card is read and, based on this, an estimate is made of the attainable rate. A variable NextQAM is then assigned the lesser of the estimate and the maximum permissible rate and the change configurator is invoked with this parameter and an indication of US (states 224, 226). Referencing FIG. 9, the change configurator sends a message in the DS transmissions to the CPE instructing it to transmit at the new rate (state 262). The change configurator then re-initialises the receiver of the line card to receive at the new rate and analyses the US transmissions for an indication of whether the CPE is sending at the new rate, advising the US configurator accordingly (states 264, 266). If the new upstream rate was established, the US configurator returns an indication of this rate to the line configurator (state 228). If not, an attempt is made to resynchronise to the US base rate of 4 QAM (state 230) and either this rate or a fail indication is returned to the line configurator (states 232, 234).

When the line configurator 76 (which was invoked in state 112) returns an ok indication to the request processor, the request processor reports to the SNMP agent via the general interface layer that the line has been configured (state 114) otherwise a configuration failure is reported (state 116) then, in either case, control returns to the main control block.

Returning to state 106 of the request processor, if line parameters exist in the line parameter table and these are valid and the maximum permissible rate has not changed, then the request processor determines whether the line is still in synchronisation (state 120). This is determined by analysing the US transmissions for an indication the CPE is in synchronisation, which the line card can only output if the line card is also in synchronisation. If the line is not in synchronisation, an attempt is made to resynchronise to the rate at which the line was last in synchronisation (state 122) If this also fails, control passes to previously describe state 108 whereat the line is marshalled.

If the line is in synchronisation or if the resynchronisation of state 122 succeeds, control passes to state 124 whereat the error power values are read for the US and DS transmissions. If these are within tolerance for the current US and downstream rates, then the request processor simply reports to the main processor block that the line is ok (state 126). If, on the other hand, the error power value for either the US or DS transmissions is too high, the change configurations utility is invoked to change the US and DS rates to their base rates of 4 QAM (state 128). If this fails, control passes to state 108 whereat the line is marshalled. If this succeeds, control passes to state 112 whereat the line configurator 76 is called. If the error power values for one of the US or DS transmissions indicates a higher rate may be available, then the upgrade configurator 78 is called (state 130). Depending upon whether this results in a new rate, the same rate, or a failed attempt, control passes to states 114, 126, or 108, respectively.

Figure 11:
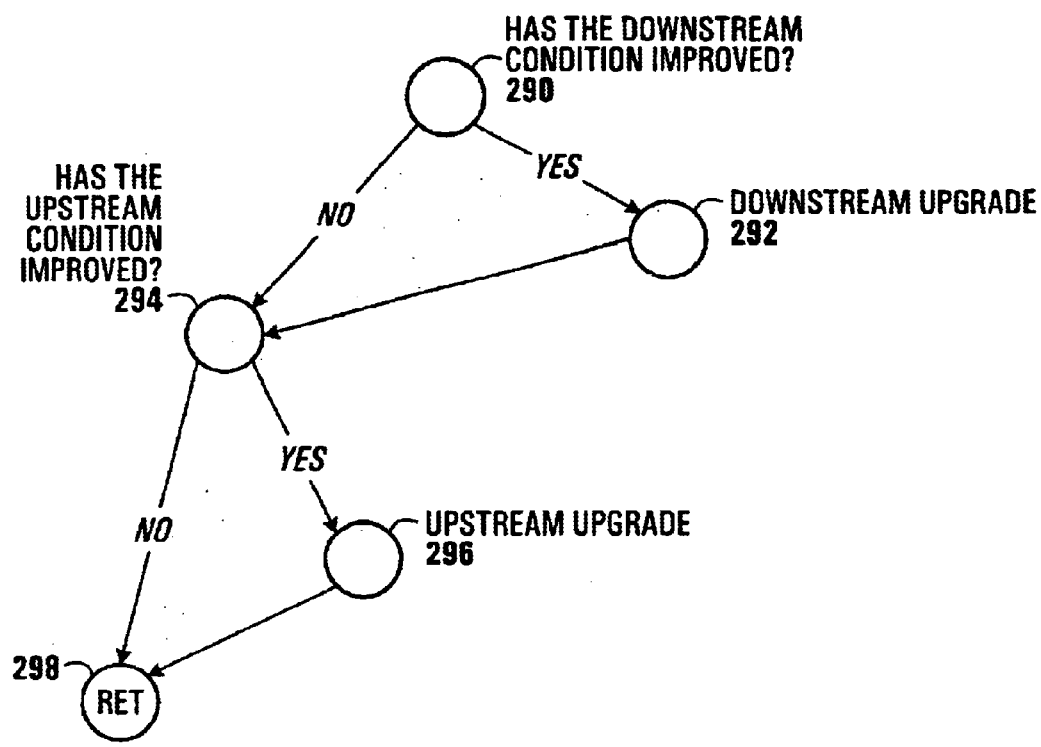
FIG. 11 is a flow diagram for the control of the upgrade configurator of FIG. 2, FIGS. 12 and 13 are flow diagram details for the control of the upgrade configurator of FIG. 2.

The upgrade configurator is illustrated in FIG. 11. Turning to this figure, if the DS condition has improved, a downstream upgrade utility is called (states 290, 292). If the US condition has improved, an US upgrade utility is called (states 294, 296), then control returns to the request processor (state 298).

Figure 12:
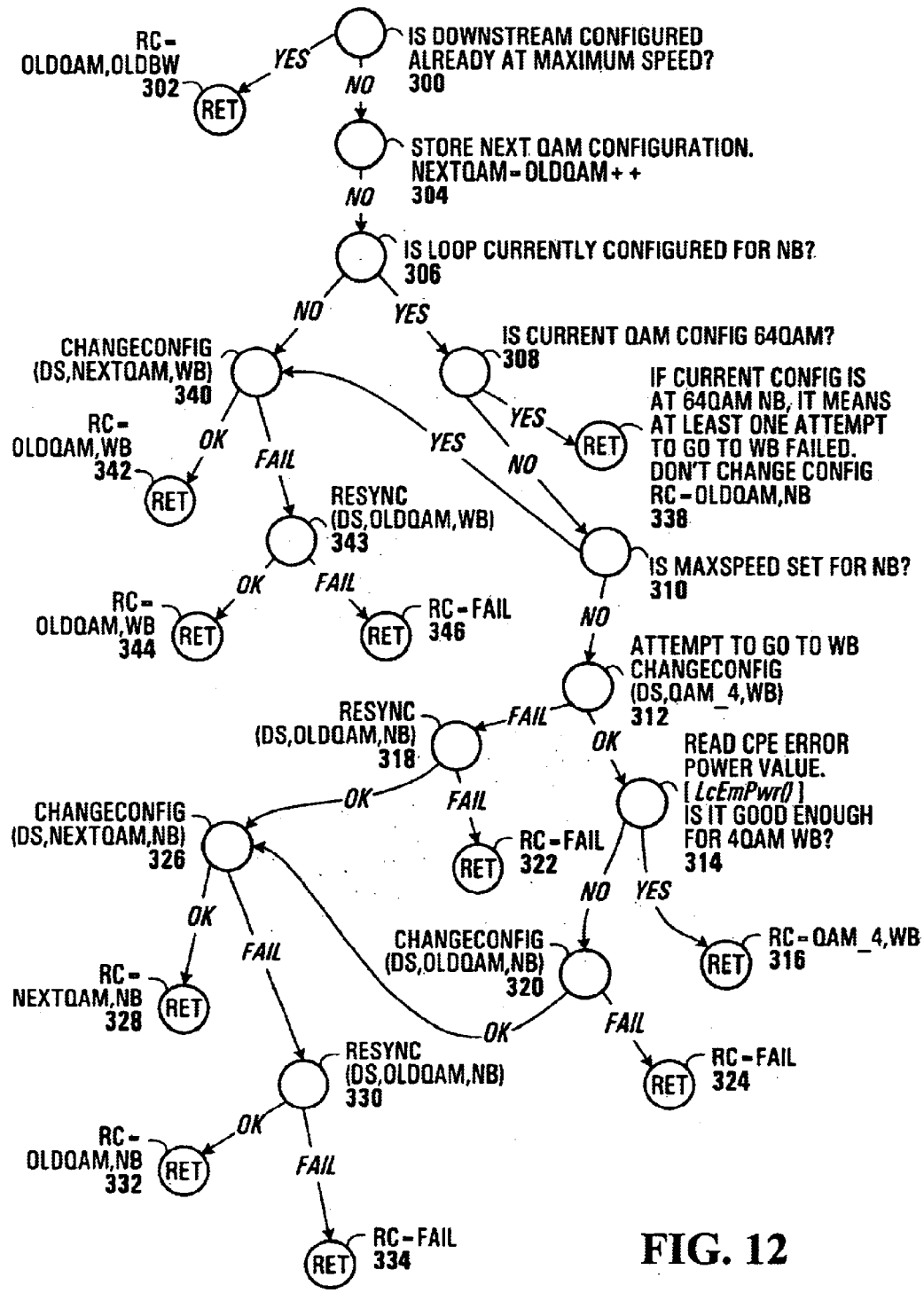

Turning to FIG. 12 which illustrates the DS upgrade utility, if the DS is already configured at the maximum rate, the rate is unchanged (states 300, 302), otherwise a new QAM level is stored which is one step up from the oldQAM level and is in the same bandwidth—NB or WB (state 304). If the line is currently configured for NB (state 306) below the 64 QAM level (state 308), then, provided the maximum permissible rate is not an NB rate (state 310) an attempt is made to go to 4 QAM WB utilizing the change configuration utility (state 312). If this succeeds, the CPE error power value is checked to ensure it is sufficiently low (state 314), if so 4 QAM WB is returned as the new rate to the DS configurator (state 316). If the attempt to go to WB fails, the resynchronisation utility is invoked to attempt to resynchronise on the old QAM NB rate (state 318). Similarly, if the error power rate is too high, the change configuration utility is invoked in an attempt to return to the old QAM NB rate (state 320). In either case, failure results in return of a fail code (states 322, 324) and success results in calling the change configuration utility in an attempt to step up to the new QAM level in the NB (state 326). If successful, this new rate is returned (state 328), otherwise, resynchronisation is attempted at the old NB rate (state 330) and either this old rate or a fail code is returned (states 332, 334).

If, in state 308, it is determined that the current NB QAM rate is already set at the highest level of 64 QAM NB, then no attempt is made to go to WB because the line rate could not reach 64 QAM NB without one previously failed WB attempt (state 338).

If, in state 304, it is determined that the line is currently configured for WB, then an attempt is made to step up to the new QAM level (state 340). If this succeeds, the new rate is returned (state 342); if it fails, an attempt is made to resynchronise to the old rate resulting in either that rate being returned (state 344) or a failure code being returned (state 346).

Figure 13:
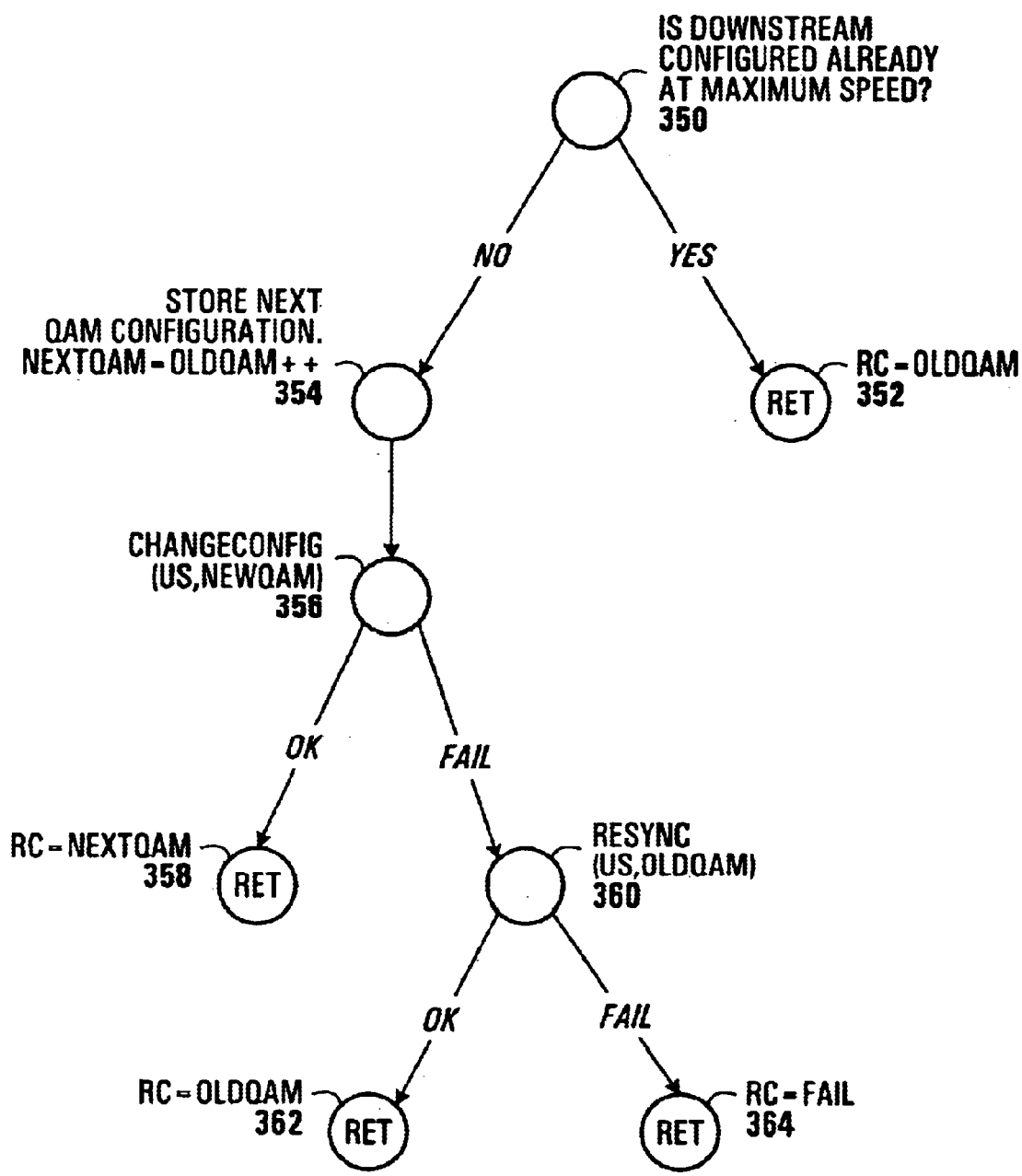

Turning to FIG. 13 which illustrates the US upgrade utility, if the US rate is already at maximum, this rate is simply returned (states 350, 352), otherwise a new QAM NB rate is stored which is one step up from the old QAM rate (state 354). Next an attempt is made to reconfigure the US to the new QAM NB rate (state 356). If this succeeds, the new rate is returned (state 358); if it fails, an attempt is made to resynchronise to the old rate (state 360) and either the old rate or a fail code is returned (states 362, 364).

Figure 14:
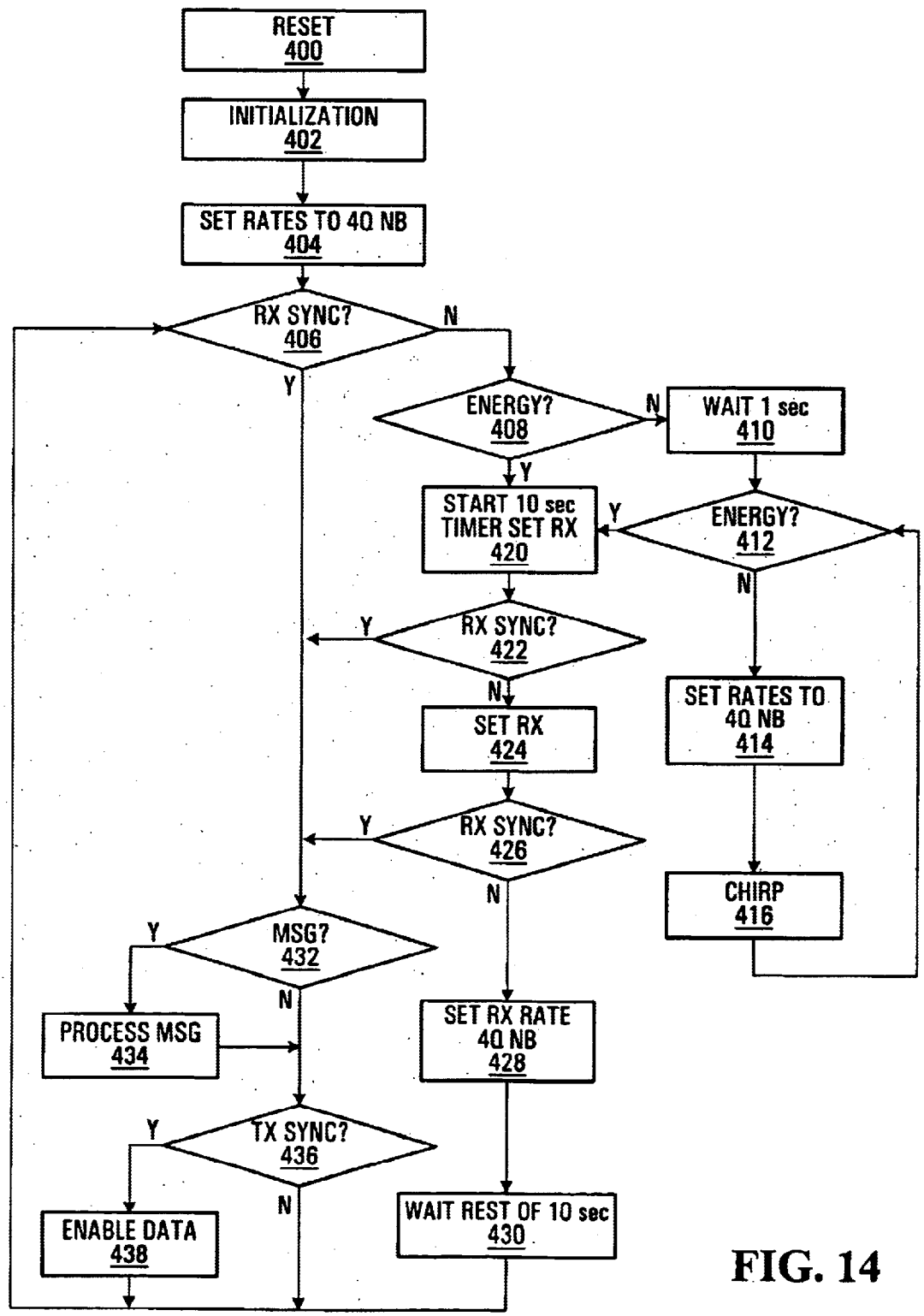
FIG. 14 is a flow diagram for a customer premises equipment (CPE) modem of FIG. 1.

FIG. 14 illustrates the software control for the CPE modem. Turning to FIG. 14, on power-up, the modem resets (block 400), initializes (block 402) and sets its US and DS communications rates to 4 QAM and 4 QAM NB, respectively (block 404). It then checks whether its receiver is synchronised to DS transmissions at the current DS communications rate (block 406). If it is not, it checks whether its receiver is receiving energy (block 408). If not, it waits one second (block 410) and tries again (block 412). If the receiver is still not receiving energy, the US and DS rates are set to 4 QAM and 4 QAM NB, respectively (block 414), and the modem causes its transmitter to chirp (block 16), i.e., send energy pulses US. Chirping continues until the receiver senses energy whereupon control passes to block 420. Control also reaches block 420 when the receiver is receiving energy when this is checked in block 408.

At block 420 a ten second timer is started and an attempt is made to synchronise the receiver to the currently set DS communications rate. If this is not successful, a second attempt is made (blocks 422, 424, 426). If neither attempt is successful, the DS communications rate is set to 4 QAM NB (block 428), there is a pause until the timer times out (block 430) and then software control returns to block 406. If either attempt at synchronising the receiver to the DS transmissions is successful, or if the receiver is found to be in synchronisation in block 406, the modem looks for a message in the DS transmissions (block 432). This message may include (i) a DS communication rate, (ii) an US communication rate, (iii) a power level, and (iv) a request for the DS error power value. The modem updates its communications rates and power level accordingly and, where requested, includes an error power value in an US transmission (block 434). Afterwards, or in the absence of a message, the modem determines whether its transmitter is transmitting at a rate to which the line card is synchronised (block 436); this is determined based on a synchronisation signal sent in the DS transmissions. If so, the CPE enables user data so that such data forms part of US transmissions (block 438). Thereafter, or if the transmitter is not transmitting at a rate to which the line card is synchronised, control returns to block 406. If the message received from the DS transmissions has changed the DS rate, the receiver will no longer be synchronised to this new rate, which will result in an attempt to synchronise to the new rate (via blocks 420 and 424).

From the foregoing description, it will be apparent that the CPE modem is a slave to the modem of the line card in respect of the setting of the communications rates.

Figure 15:
FIG. 15 is a frame format which may be used for transmissions.

US and DS transmissions are preferably frame based. FIG. 15 illustrates a suitable frame format. Turning to FIG. 15, a frame comprises framing pattern bits 450, information field bits 452, message channel bits 454, payload bits 456, and error checking bits 458. The framing pattern bits comprise a pre-determined bit pattern on which the modem receiver (either CPE or line card) may synchronise. Bits are set in the information field by each modem to indicate when the modem receiver is synchronised to the current communications rate. The message channel is used to send messages between the modems. Thus, the line card uses this channel to send an indication of desired communication rates and power level and to request an error power value. The CPE modem uses the message channel, in response to a request, to send its measured error power and power level as well as its current set communication rates. Payload and error checking bits are conventional.

From the foregoing, it will be apparent that the present system launches communications at a base rate and then tries to upgrade communication speed whenever it can based on a measure of SNR, but falling back when necessary.

While QAM modulation has been described as the preferred modulation scheme, other modulation schemes are possible, such as frequency shift keying (FSK).

Other modifications will be apparent to those skilled in the art and, therefore, the invention is defined in the claims.

What is claimed is:

1. A method of setting a downstream communications rate on a communications line, comprising:

where no downstream communications rate is established on said communications line, establishing a base downstream communications rate on said communications line;

determining a downstream signal to noise ratio (SNR) on said communications line;

based on said downstream SNR, predicting an acceptable downstream communications rate;

if said predicted acceptable downstream communications rate is greater than said established downstream communications rate, sending an indication of a new downstream communications rate on said line based on said predicted downstream communications rate and thereafter attempting to establish said new downstream communications rate on said line, wherein said establishing a base downstream communications rate comprises:

silencing said communications line in the downstream direction for a pre-determined time;

transmitting downstream at a pre-determined downstream base communications rate;

monitoring for upstream energy on said communications line;

on detecting upstream energy, messaging in downstream transmissions a requested upstream communications rate and an upstream high power level;

on detecting upstream transmissions at said requested upstream communications rate, synchronising to said upstream transmissions; and at least once: reading an upstream SNR and upstream power level from said upstream transmissions, determining whether said upstream SNR exceeds a threshold, and, if said upstream SNR exceeds said threshold, messaging in downstream transmissions a requested upstream power level which is lower than said read upstream power level.

2. The method of claim 1 wherein communications on said communication line is frame based with each frame comprising information bits and wherein said attempting to establish said new communications rate comprises transmitting frames downstream at said new communications rate and analysing, information bits from received upstream frames for an indication said new downstream communications rate is acceptable.

3. The method of claim 1 further comprising, after synchronising to said upstream transmissions, analysing said upstream transmissions for an indication of synchronisation being achieved in respect of downstream transmissions.

4. The method of claim 1 wherein said determining a downstream signal to noise ratio comprises sending a message downstream querying a downstream SNR.

5. A method of setting an upstream communications rate on a communications line, comprising:
   where said communications line is silent in a downstream direction, sending energy pulses upstream and monitoring for transmissions downstream at a pre-determined downstream base communications rate;
   on detecting downstream transmissions at said pre-determined downstream base communications rate, synchronising to said downstream transmissions; and processing each downstream transmission for a message comprising an upstream communication rate and, thereafter, transmitting upstream at said upstream communications rate,
   wherein said message also comprises an upstream power level and, thereafter, transmitting upstream at said upstream power level.

6. A method of setting an upstream communications rate on a communications line, comprising:
   processing each downstream transmission for a message comprising a requested upstream communication rate and an upstream power level and, thereafter, transmitting upstream at said upstream communications rate and said upstream power level;
   where said communications line is silent in a downstream direction, sending energy pulses upstream and monitoring for transmissions downstream at a pre-determined downstream base communications rate;
   on detecting downstream transmissions at said pre-determined downstream base communications rate, synchronising to said downstream transmissions; and
   determining a downstream SNR on said communications line and sending an indication of said downstream SNR in upstream transmissions.

7. A method of setting an upstream communications rate on a communications line, comprising:
   processing each downstream transmission for a message comprising a requested upstream communication rate and an upstream power level and, thereafter, transmitting upstream at said upstream communications rate and said upstream power level;
   where said communications line is silent in a downstream direction, sending energy pulses upstream and monitoring for transmissions downstream at a pre-determined downstream base communications rate;
   on detecting downstream transmissions at said pre-determined downstream base communications rate, synchronising to said downstream transmissions; and
   after synchronising to said downstream transmissions, sending an indication in upstream transmissions that synchronisation to downstream transmissions has been achieved.

8. A method of setting an upstream communications rate on a communications line, comprising:
   processing each downstream transmission for a message comprising a requested upstream communication rate and an upstream power level and, thereafter, transmitting upstream at said upstream communications rate and said upstream power level;
   where said communications line is silent in a downstream direction, sending energy pulses upstream and monitoring for transmissions downstream at a pre-determined downstream base communications rate; and
   on detecting downstream transmissions at said pre-determined downstream base communications rate, synchronising to said downstream transmissions,
   wherein said processing is ongoing and wherein whenever a message is processed comprising a new downstream communications rate different from an existing downstream transmissions rate, thereafter attempting to synchronise to said new downstream communications rate.

9. A method of handling communications on a communication line, comprising:
   monitoring for upstream energy on said communication line;
   on detecting upstream energy, messaging downstream a requested upstream communications rate and an upstream high power level;
   on detecting upstream transmissions at said requested upstream communications rate, synchronising to said upstream transmissions;
   reading a current upstream power level from said upstream transmissions; and
   at least once, detecting an upstream signal-to-noise ratio (SNR), determining whether said SNR exceeds a threshold, and, if so, messaging downstream a new requested upstream power level that is lower than said current upstream power level.

10. A system capable of setting a downstream communications rate on a communications line, comprising:
    means, where no downstream communications rate is established on said communications line, for establishing a base downstream communications rate on said communications line;
    means for determining a downstream signal to noise ratio (SNR) on said communications line;
    means, based on said downstream SNR, for predicting an acceptable downstream communications rate;
    means for, if said predicted acceptable downstream communications rate is greater than said established downstream communications rate, sending an indication of a new downstream communications rate on said line based on said predicted downstream communications rate and thereafter attempting to establish said new downstream communications rate on said line,
    wherein said means for establishing a base downstream communications rate;
    silences said communications line in the downstream direction for a pre-determined time;
    transmits downstream at a pre-determined downstream base communications rate,
    monitors for upstream energy on said communications line;
    on detecting upstream energy, messages in downstream transmissions a requested upstream communications rate and an upstream high power level;
    on detecting upstream transmissions at said requested upstream communications rate, synchronises to said upstream transmissions; and
    at least once: reads an upstream SNR and upstream power level from said upstream transmissions, determines whether said upstream SNR exceeds a threshold, and, if said upstream SNR exceeds said threshold, messages in downstream transmissions a requested upstream power level which is lower than said read upstream power level.

* * * * *